(12) United States Patent
Poteet et al.

(10) Patent No.: US 11,598,374 B2
(45) Date of Patent: Mar. 7, 2023

(54) BEARING SYSTEM

(71) Applicant: Delavan Inc., West Des Moines, IA (US)

(72) Inventors: Steven Poteet, Ashland, MA (US); Kevin M. Rankin, Windsor, CT (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 30 days.

(21) Appl. No.: 17/242,054

(22) Filed: Apr. 27, 2021

(65) Prior Publication Data
US 2021/0332852 A1 Oct. 28, 2021

Related U.S. Application Data

(60) Provisional application No. 63/016,151, filed on Apr. 27, 2020.

(51) Int. Cl.
F16C 33/66 (2006.01)
F16C 33/62 (2006.01)
F16H 57/04 (2010.01)

(52) U.S. Cl.
CPC .......... F16C 33/6696 (2013.01); F16C 33/62 (2013.01); F16H 57/041 (2013.01); F16H 57/0471 (2013.01)

(58) Field of Classification Search
CPC ........ F16C 17/10; F16C 17/107; F16C 33/04; F16C 33/1095; F16C 33/24; F16C 33/62; F16C 33/6696; F16C 2361/61; F16H 57/041; F16H 57/0471
See application file for complete search history.

(56) References Cited

U.S. PATENT DOCUMENTS 379,531 A * 3/1888 Douglas, Jr. ............ F16C 33/14
508/108
1,746,020 A * 2/1930 Whiteley ............. F16C 33/1095
384/284
2,294,939 A * 9/1942 Shoemaker ............. F16C 33/06
384/191.2
2,757,055 A * 7/1956 Davis ..................... F16C 33/14
205/228
2,971,248 A * 2/1961 Kingsley ................ F16C 33/24
29/527.3

(Continued)

FOREIGN PATENT DOCUMENTS

CN 106151278 A 11/2016
CN 106687236 A * 5/2017 ................ B22F 1/02

(Continued)

OTHER PUBLICATIONS

Extended European search report issued in corresponding EP application No. 21170552.0, dated Sep. 10, 2021.

Primary Examiner — Phillip A Johnson
(74) Attorney, Agent, or Firm — Locke Lord LLP; Joshua L. Jones; Gabrielle L. Gelozin

(57) ABSTRACT

A bearing system including a first member having an outer surface wherein at least a portion of the outer surface includes a plurality of plateaus and a plurality of indentations, a dry-film lubricant at least partially filling at least one of the plurality of indentations, and a second member having a mating surface to the outer surface of the first member wherein the second member configured to move past the first member.

17 Claims, 2 Drawing Sheets

(56) References Cited

U.S. PATENT DOCUMENTS

| | | | |
|---|---|---|---|
| 5,000,586 A * | 3/1991 | Daxer | F16C 33/24 |
| | | | 384/282 |
| 5,120,395 A | 6/1992 | Monson et al. | |
| 6,149,160 A | 11/2000 | Stephens et al. | |
| 7,431,507 B2 * | 10/2008 | Tsuji | F16C 33/14 |
| | | | 384/907 |
| 7,833,609 B2 * | 11/2010 | Fujita | F16C 33/1095 |
| | | | 428/323 |
| 7,846,556 B2 | 12/2010 | Erdemir et al. | |
| 8,123,413 B2 | 2/2012 | Tambe et al. | |
| 9,500,226 B2 | 11/2016 | Hunt et al. | |
| 9,976,209 B2 * | 5/2018 | Ito | C23C 14/022 |
| 10,060,479 B2 | 8/2018 | Ai et al. | |
| 2002/0141671 A1 | 10/2002 | Narkon et al. | |
| 2004/0228554 A1 | 11/2004 | Fujita et al. | |
| 2005/0008271 A1 * | 1/2005 | Lee | F16C 33/1095 |
| | | | 384/293 |
| 2013/0058605 A1 | 3/2013 | Hirayama et al. | |
| 2014/0169711 A1 * | 6/2014 | Hanaka | F16C 17/02 |
| | | | 384/284 |
| 2015/0159694 A1 | 6/2015 | Hirayama et al. | |
| 2015/0337949 A1 * | 11/2015 | Ziegler | F16H 57/0471 |
| | | | 475/159 |
| 2017/0298990 A1 | 10/2017 | Lozier et al. | |
| 2018/0372151 A1 | 12/2018 | Sridhar et al. | |
| 2019/0226525 A1 * | 7/2019 | Harano | F16C 33/201 |

FOREIGN PATENT DOCUMENTS

| | | | | |
|---|---|---|---|---|
| DE | 620370 C | * | 10/1935 | |
| DE | 3905450 C2 | * | 7/1998 | F16C 17/026 |
| WO | 2011072664 A1 | | 6/2011 | |

* cited by examiner

BEARING SYSTEM

CROSS-REFERENCE TO RELATED APPLICATIONS

This application claims priority to and the benefit of U.S. Provisional Application No. 63/016,151, filed Apr. 27, 2020, the entire contents of which are herein incorporated by reference in their entirety.

BACKGROUND

Technological Field

The present disclosure relates to a bearing system, and more particularly to a method of increasing the life of the bearing system.

Description of Related Art

A variety of devices are known for lubricating and protecting gears and other components that include members spinning adjacently to each other. Although conventional methods and systems have generally been considered satisfactory for their intended purpose, today's gears require greater protection from stresses such as cavitation and greater protection from faster speeds. Thus, there is still a need in the art for a bearing system having improved lubrication protection. There also remains a need in the art for such systems and components that are economically viable. The present disclosure may provide a solution for at least one of these remaining challenges.

SUMMARY OF THE INVENTION

A bearing system including a first member having an outer surface wherein at least a portion of the outer surface includes a plurality of plateaus and a plurality of indentations, a dry-film lubricant at least partially filling at least one of the plurality of indentations, and a second member having a mating surface to the outer surface of the first member wherein the second member configured to move past the first member. The first member can be a floating bearing and the second member can be a gear tooth set.

The dry-film lubricant can cover at least a portion of the plurality of plateaus, fill each of the plurality of indentations, and defines a layer covering each of the plateaus. At least a portion of the first outer surface of the first member could not include an indentation thereon. A mating surface of the second member also does not include indentations.

The plurality of indentations can include differing depths or shapes. At least one of the indentations includes a concave portion. At least one of the indentations can include a depth greater than a width. Keep in mind that the width would need to be large enough to incorporate the dry film lubricant being applied. The plurality of indentations can include an array of indentations wherein a distance between centers of adjacent indentations is greater than a diameter of each of the indentations. The plurality of indentations can also include comprising a plurality of arrays, wherein each of the plurality of arrays includes a differing spacing between adjacent indentations. Each array of the plurality of arrays can be separated by a portion a surface not having indentations.

The dry-film lubricant can include a lower load carrying capacity than the first member. The dry-film lubricant can include a higher wear coefficient than the first member. The first member can include an aluminum bronze or aluminum nickel bronze alloy. The second member can include steel. The plurality of indentations can be produced using a laser. The laser can be programmable.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
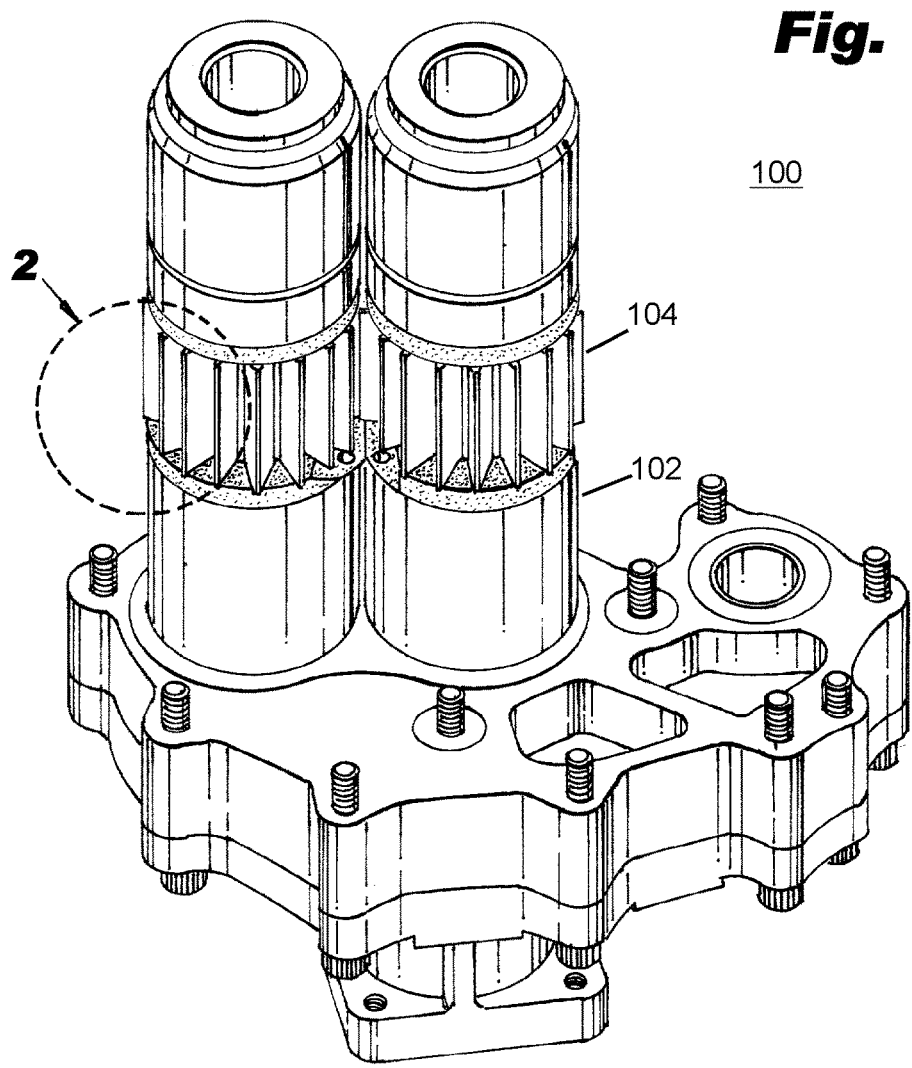
FIG. 1 is a perspective view of a bearing system.

Reference will now be made to the drawings wherein like reference numerals identify similar structural features or aspects of the subject invention. For purposes of explanation and illustration, and not limitation, a partial view of an exemplary embodiment of a bearing system in accordance with the invention is shown in FIG. 1 and is designated generally by reference character 100. Other embodiments of the bearing system in accordance with the disclosure, or aspects thereof, are provided in FIGS. 2-3, as will be described. The methods and systems of the invention can be used to protect bearings from cavitation and sudden seizure.

FIG. 1 shows a bearing system 100 including a floating bearing 102 and a gear tooth set 104. As the teeth of the spin past a surface of the bearing facing, the mating surface of the teeth can sometimes strike the surface. In order protect the bearing system from wearing out, cavitation, or sudden seizure the surface of the bearing is textured and includes a lubricant.

Figure 2:
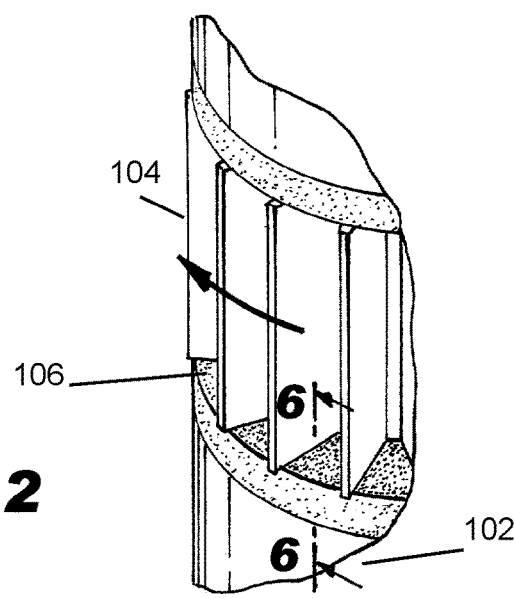
FIG. 2 is perspective view of the floating bearing of the bearing system of FIG. 1 showing the motion of the gear tooth set along an outer face of a floating bearing.
Figure 3:
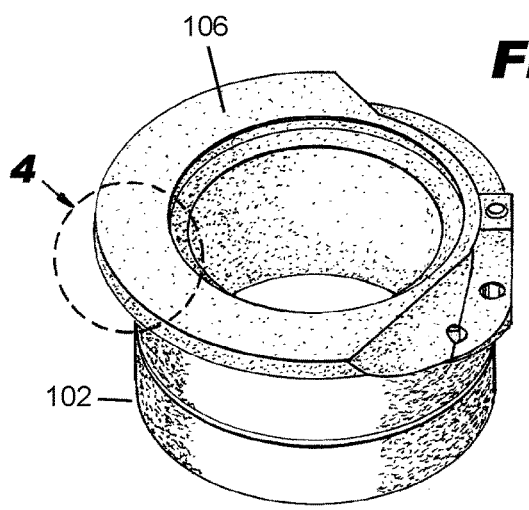
FIG. 3 is a perspective view of the outer face of the floating bearing.
Figure 4:
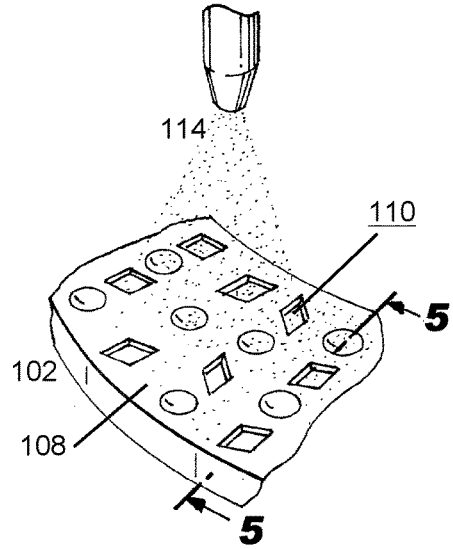
FIG. 4 is a perspective view of the outer face of the floating bearing of FIG. 3, showing a deposition of a dry-film lubricant and a plurality of indentations.

FIG. 2 shows outer surface 106 of the floating bearing 102. A portion of the outer surface 106 includes a plurality of plateaus 108 and a plurality of indentations 110 (shown in detail in FIG. 5). The gear tooth set 104 is shown moving past the outer surface 106. FIG. 3 shows a location of the plateaus 108 and indentations 110 along the outer surface 106. FIG. 4 shows a plurality of indentations 110 can include differing depths, widths, areas, or shapes. The plurality of indentations 110 can include an array of indentations wherein a distance between centers of adjacent indentations is greater than a diameter of each of the indentations. It is also considered that the plurality of indentations 110 can also include a varied spacing between each of the indentations.

Figure 5:
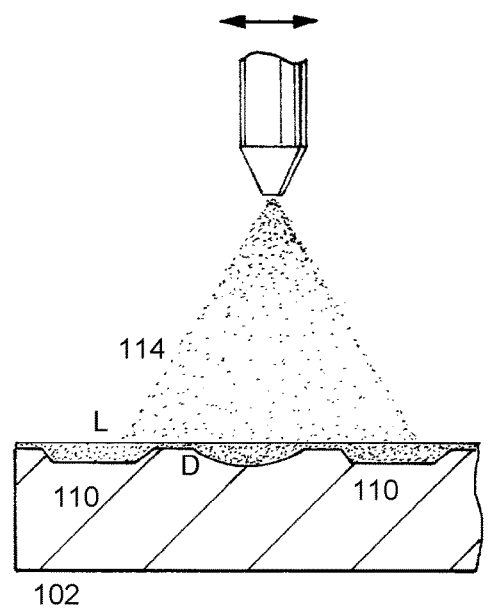
FIG. 5 is a side view of the outer face of the floating bearing of FIG. 3, showing a deposition of the dry-film lubricant and the indentations.
Figure 6:
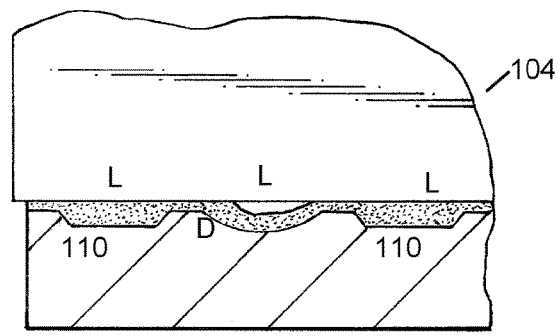
FIG. 6 is a side view of the outer face of the floating bearing of FIG. 3, showing the dry-film lubricant and the gear tooth.

As shown in FIGS. 5 and 6, the indentations 110 can include concave portions, or can include angled sidewall. The indentations 110 are preferred to have a depth (D greater than a width (l) such that the width is large enough to incorporate lubricant being applied. Considering that a dry-film lubricant 114, having pigments (lubricant and corrosion inhibitors) range from 1.2 micron to 9 microns, the width (l) of the indentation 110 needs to be at minimum 1.5 microns up to 10 microns. A minimum depth (d) is 0.5 microns, with a maximum depth, such that bearing strength is not affected, is no greater than 1000 and more preferably 500 microns. Also, a minimum width/depth ratio should be 2.5. The dry-film lubricant 114 filling each of the indentations and defines a layer 116 covering each of the plateaus 108. The dry-film lubricant 114 includes a lower load carrying capacity than the material of the bearing 102. The dry-film lubricant 114 can also include a higher dimensionless wear coefficient (K) than the bearing 102. The bearing 102 can include an aluminum bronze or aluminum nickel bronze alloy, as this alloy has better resistance to cavitation than leaded bronze alloys. Although leaded bronze has added lubricity due to immiscible lead content that can lead to surface if dry film lubricant ($MoS_2$-based) is worn away, and while complete wear of lubricant is less frequent, touchdowns of the tooth set 104 on the outer surface 106 do occur that can remove dry film lubricant. Touchdowns can result in exposing bare alloy, of which aluminum bronze alloys have higher coefficient of friction which can lead to galling and seizing. Placing indentations 110 allows for a timed release of more DFL as the initial layer of DFL wears off. The gear teeth 104 include steel and the mating surface of the gear teeth facing the indentations 110 of the bearing 102 does not include indentations.

The plurality of indentations 110 can be produced using a laser. The laser can be programmable in order to keep ablation at a minimum to minimize fatigue debit on the surface. Lasers can be precise and programmable, allowing specific tailoring of the depth/width profiles, as well as specific geometries.

The systems and methods of the present disclosure, as described above and shown in the drawings, provide for a bearing system with superior properties including increased reliability. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A bearing system comprising:
a first member having an outer surface wherein at least a portion of the outer surface comprises a plurality of plateaus and a plurality of indentations;
a dry-film lubricant at least partially filling at least one of the plurality of indentations; and
a second member configured for moving past the first member, wherein a distance between a first pair of adjacent indentations differs from a distance between second pair of adjacent indentations.

2. The bearing system of claim 1, wherein the first member is a floating bearing and the second member is a gear tooth set.

3. The bearing of claim 1, wherein the dry-film lubricant covers at least a portion of the plurality of plateaus.

4. The bearing of claim 1, wherein the dry-film lubricant fills each of the plurality of indentations, and defines a layer covering each of the plateaus.

5. The bearing system of claim 1, wherein at least a portion of the outer surface of the first member does not include an indentation thereon.

6. The bearing system of claim 1, wherein the second member comprises steel.

7. The bearing system of claim 1, wherein the dry-film lubricant comprises a lower load carrying capacity than the first member.

8. The bearing system of claim 1, wherein the dry-film lubricant includes a higher wear coefficient than the first member.

9. The bearing system of claim 1, wherein the plurality of indentations includes differing depths.

10. The bearing system of claim 1, wherein the plurality of indentations include multiple cross section defining differing shapes.

11. The bearing system of claim 1, wherein the first member includes an aluminum bronze alloy.

12. The bearing system of claim 1, wherein the plurality of indentations are produced by laser machining.

13. The bearing system of claim 1, wherein the mating surface of the second member does not include indentations.

14. The bearing system of claim 1, wherein at least one of the indentations includes a maximum width greater than a maximum depth of the indentation.

15. The bearing system of claim 1, wherein the plurality of indentations includes an array of indentations wherein a distance between centers of adjacent indentations is greater than a diameter of each of the indentations.

16. The bearing system of claim 1, wherein at least one of the indentations includes a concave portion of a floor of the indentation.

17. The bearing system of claim 1, wherein at least one of the indentations includes sides disposed angled with respect to each other at a non-right angle.

* * * * *